July 17, 1923.
B. S. PERO
1,462,354
SPEED CONTROL FOR MACHINE TOOLS AND THE LIKE
Filed Oct. 4, 1921
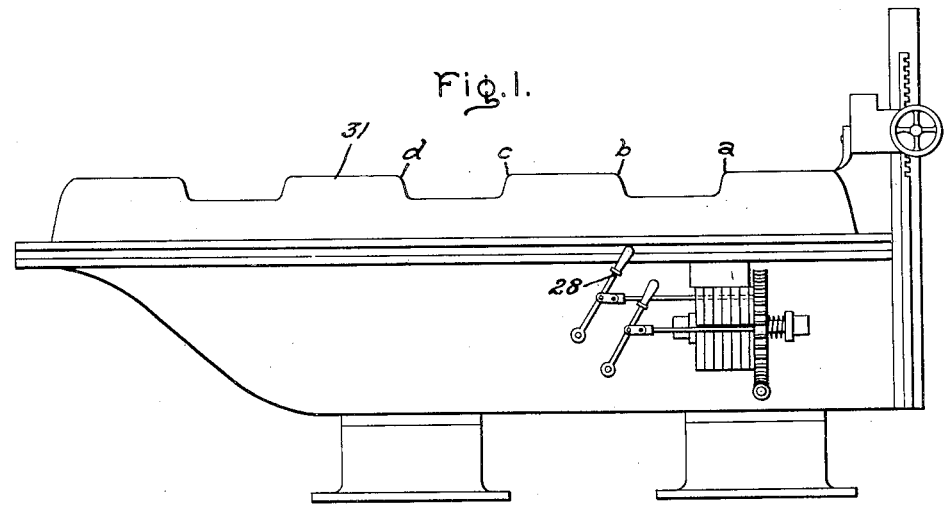
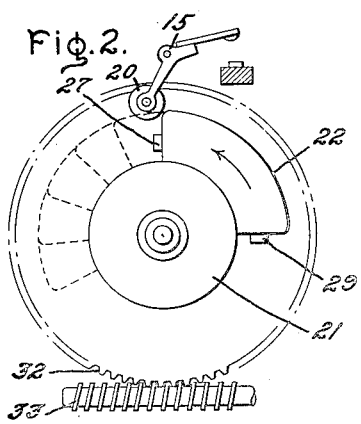
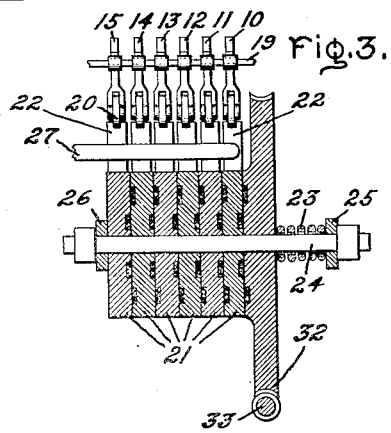
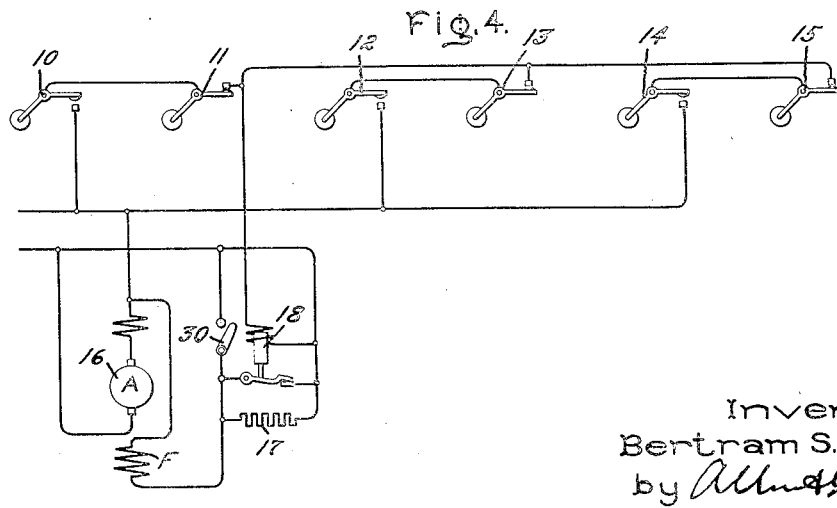
Inventor:
Bertram S. Pero,
by Albert G. Davis
His Attorney.

Patented July 17, 1923.

1,462,354

UNITED STATES PATENT OFFICE.

BERTRAM S. PERO, OF SCHENECTADY, NEW YORK, ASSIGNOR TO GENERAL ELECTRIC COMPANY, A CORPORATION OF NEW YORK.

SPEED CONTROL FOR MACHINE TOOLS AND THE LIKE.

Application filed October 4, 1921. Serial No. 505,292.

*To all whom it may concern:*

Be it known that I, BERTRAM S. PERO, a citizen of the United States, residing at Schenectady, county of Schenectady, State of New York, have invented certain new and useful Improvements in Speed Controls for Machine Tools and the like, of which the following is a specification.

My invention relates to the control of the speed of machines, particularly those which are driven by electric motors and has for its object the provision of improved means whereby the speed of the machine may be varied in accordance with a predetermined plan under the control of the operator in a simple and reliable manner.

My invention relates more specifically to the control of machines such as machine tools and the like, the speed of which may be varied at different points in the progress of the work. In the case, for instance, of a machine tool, such as a planer, it is frequently desirable to increase its speed at intervals and subsequently resume the normal speed. This is desirable where the nature of the work is such that during portions of the travel of the platen the tool is not doing work, that is, it is "wind cutting." Sometimes in the planing of large castings there are considerable spaces in which no cutting is to be done between portions where the tool is actually cutting. While the tool is traversing these spaces the machine may advantageously be speeded up since no cutting is being done and thereby save considerable time. On large pieces of work where there are large spaces in which no cutting is done such saving will be quite material. This saving might, however, be entirely counteracted if any considerable time were consumed in setting up of the work to bring about the saving. In order that such an arrangement should be worth employing the apparatus for doing it must be exceedingly simple and inexpensive and readily set by the operator while the machine is in operation.

In carrying out my invention I employ a plurality of switches which are successively operated by members driven in synchronism with the moving element of the machine as, for instance, the platen of the planer. These elements are set at various positions corresponding with the character of the work so as to operate the switches as required. In one form of my invention these elements are normally driven by the machine through friction and are held against movement under manual control. By operating a manually operated lever the elements may be released successively while the machine is in operation so as to allow them to move with the machine. In other words, at the beginning of the work the operator watches the progress of the platen of the planer and when the points are successively reached at which the speed should be changed, he operates the lever to release the elements. These elements are set in proper relation to effect the changes in speed required and having once been set they will continue to function in the same way on each successive cut. A more complete understanding of the exact nature of my invention will be obtained from the following description taken in connection with the accompanying drawing in which I have shown my invention embodied in concrete form for purposes of illustration.

Referring to the drawing illustrating my invention, Fig. 1 is a side view of a planer equipped with my improvement; Fig. 2 is an end view showing the cam elements for operating the switches; Fig. 3 is a sectional view of the same; and Fig. 4 is a diagram of the circuit connections.

In order that a clear understanding of the machine as a whole may be had I shall first describe the circuit connections. Referring first to Fig. 4, therefore, the numerals 10, 11, 12, 13, 14, 15 represent switches which control the circuit of an electric motor 16 having armature A and shunt field winding F. I have not attempted to show the connections whereby the normal operations of this motor are brought about. The particular drive for the planer forms no part of my invention. Generally speaking, the motor is direct connected to the planer and is reversed at the end of each stroke. On the cutting stroke the motor has a lower speed than on the return stroke. This is all standard apparatus and need not be further described. In addition to the apparatus for normally driving the planer I provide a resistance 17 in series with the shunt field of the motor for varying the speed of the motor. This resistance is controlled by an electromagnetic switch or contactor 18 which, when it is closed, short circuits the resistance but, when it is open, the resistance is in circuit with the field winding and, therefore, increases the speed of the motor. The circuit of this contactor 18, which is normally closed, is controlled by the switches 10 to 15. It will be noted that switches 10, 12 and 14 are normally open, whereas switches 11, 13 and 15 are normally closed. Assuming that these switches should be operated successively, it will be seen that the motor will successively and alternately speed up and slow down. As shown, there are three different circuits controlling the contactor, each containing two switches, one normally open and the other normally closed in series. As shown, the contacter 18 is de-energized and its contacts are therefore closed because each of the normally open switches is open. Assuming, however, that the switch 10 is first closed, then the contactor 18 will be energized and its contacts opened to cause the motor to run at increased speed. If the next switch 11 is now operated, it will open, thereby causing the contactor 18 to be de-energized and close its contacts to short circuit the resistance 17 thereby slowing down the motor. If the next switch 12 is now closed, contactor 18 will again be energized, the circuit being through switches 12 and 13. Likewise when switch 13 is opened, contactor 18 will be de-energized. In the same way when the switch 14 closes, contactor 18 will be energized and when the switch 15 opens, the contactor will be de-energized. The result is that the motor alternately increases and decreases the speed, depending upon the successive operation of the switches 10 to 15.

Referring now to Figs. 1 to 3, it will be seen that the switches 10 to 15 are all pivoted on a shaft 19, the operating end of each switch being provided with an anti-friction roller 20. Cooperating with these rollers to operate the switches are friction disks 21 each provided with a cam surface 22 which engages a roller on the switch to operate it. As shown, these disks are driven by friction from a worm wheel 32 driven by a worm 33. This worm wheel is geared so that it will make something less than a complete revolution upon a complete stroke of the planer. The friction disks are held in frictional contact so as to be driven by the disk 32 by a spring 23 surrounding a rod or shaft 24 upon which the disks are mounted. This spring compresses the disks between the friction face of the worm wheel and a collar 26. When the worm wheel rotates, therefore, the disks 21 will normally rotate with it. The disks are prevented from rotation, however, by a rod 27 operated by a handle 28. As shown in Fig. 3, the rod 27 extends inward far enough to stop the rotation of all of the disks 21. If, however, the rod 27 should be moved to the left far enough to disengage from the cam on the disk next to the worm wheel, this disk will then be rotated by friction and its cam will operate the switch 10. If the rod 27 were moved farther to the left it will release the next disk so that the switch 11 will be operated. Likewise with all the remaining disks and switches, so that if the rod should be moved to the left far enough all of the disks would be released and, therefore, all of the switches 10 to 15 operated. By releasing these disks one after another at proper intervals it will be seen that the cams 22 will be distributed around the shaft 24, as shown in dotted lines in Fig. 2. Upon the return stroke of the planer these switches will be reset and on a succeeding stroke the same sequence of operation of the switches will occur. I likewise provide a manually operated rod 29 which engages the cams on the opposite end from that engaged by the rod 27. This rod 29 has the function of bringing the cams back to their normal position, that is, the position in which all the cams are similarly located. A switch 30 is also provided for short circuiting the resistance 17 upon the return stroke of the planer so that the operation of the switches 10 to 15 will not have any effect. This switch will be operated by the regular control mechanism of the motor which is not shown.

As thus constructed and arranged the operation of my device is as follows: Assume that casting 31, shown in Fig. 1, is on the planer bed and the cutting stroke is started, the switches 10 to 15 being in the positions shown in Fig. 4, that is, they will all be in their normal positions. When the point $a$ is reached, the operator will shift the rod 27 to the left by means of the handle 28 far enough to release the first disk, whereupon the switch 10 will be operated. This, it will be seen by referring to Fig. 4, will close the circuit of the contractor 18 and speed up the motor. The bed of the planer will now travel at increased speed forward while this "wind cut" is being taken and when the point $b$ is reached the operator will again shift the rod 27 to the left releasing the next disk 21 which will open the switch 11. This will, of course, de-energize the contactor 18 and again reduce the speed of the motor. When the point $c$ is reached the rod 17 is again shifted, releasing the next disk so as to operate the switch 12 to again energize the contactor and speed up the motor; and when point $d$ is reached the next disk is released so as to operate the switch 13 to decrease the speed of the motor. In like manner the next two disks will be released successively to operate the switches 14 and 15. The rod 27 being withdrawn, the disks with their operating cams are now located at proper points so as to operate the switches at the proper time. On the reverse stroke of the planer the cams are returned in the relation which has been established and upon the next stroke forward the operation will be repeated. This setting having been once made the operation will be repeated until the setting is changed, but, of course, it will be understood that any number of the disks may be released and, therefore, the corresponding switches operated, depending upon the nature of the work.

During the operation just described the rod 29 is entirely withdrawn. In order to return the disks to their proper positions, however, the rod 29 is pushed inward so that upon the return stroke of the planer the disks will all abut against the rod 29 and will be brought together. The rod 27 will then be returned to place and the apparatus is ready for a new setting.

It will be seen that I have provided a very simple arrangement whereby the setting of the various switches is accomplished while the machine is in operation. All that is necessary for the operator to do is to watch the progress of the platen and when the proper time comes for changing the speed he pulls the lever one notch. Once set the apparatus continues to operate without further attention.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is,—

1. The combination with a machine tool or the like and an electric motor for driving the same, of means for automatically increasing and decreasing the speed thereof in accordance with the progress of the work and manually controlled means for changing the periods of increased and decreased motor speed while the machine is in operation.

2. The combination with a machine tool or the like and an electric motor for driving the same, of means for automatically varying the speed thereof comprising a plurality of speed varying switches, a plurality of switch operating members therefor, means for causing relative movement of the switches and the members in synchronism with the machine tool, and manually controlled means for either arresting or permitting said relative movement at will.

3. The combination with a machine tool or the like and an electric motor for driving the same, of means for automatically varying the speed thereof comprising a plurality of speed varying switches, a plurality of switch operating elements driven in synchronism with the machine and a manually controlled member for holding said elements against movement and releasing them successively at will.

4. The combination with a machine tool or the like and an electric motor for driving the same, of means for automatically varying the speed thereof comprising a plurality of speed varying switches, a plurality of switch operating members therefor, driven in synchronism with the machine tool and manually controlled means for throwing said members into and out of said operation at will.

5. The combination with a machine tool or the like and an electric motor for driving the same, of means for automatically varying the speed thereof comprising a plurality of normally closed and normally open switches, a speed varying resistance controlled thereby, a plurality of operating members for said switches driven in synchronism with the machine to successively operate the normally closed switches alternately with the normally open switches to alternately increase and decrease the speed of the machine.

6. The combination with a machine tool or the like and an electric motor for driving the same, of means for automatically varying the speed thereof comprising a plurality of normally closed and normally open switches, a speed varying resistance controlled by said switches and means for successively operating the normally closed switches alternately with the normally open switches to alternately increase and decrease the speed of the machine.

7. The combination with a machine tool or the like and an electric motor for driving the same, of means for automatically increasing and decreasing the speed thereof in accordance with the progress of the work comprising a plurality of speed varying switches, a plurality of switch operating members therefor frictionally driven in synchronism with the machine tool and manually controlled means for either holding said member against movement or releasing them successively.

In witness whereof, I have hereunto set my hand this 3rd day of October 1921.

BERTRAM S. PERO.